3,140,443
FREQUENCY SCANNING RECEIVER WITH
CLUTTER REJECTION
Floyd T. Wimberly, Lexington, Mass., assignor to Raytheon Company, Lexington, Mass., a corporation of Delaware
Filed May 26, 1961, Ser. No. 112,879
13 Claims. (Cl. 325—335)

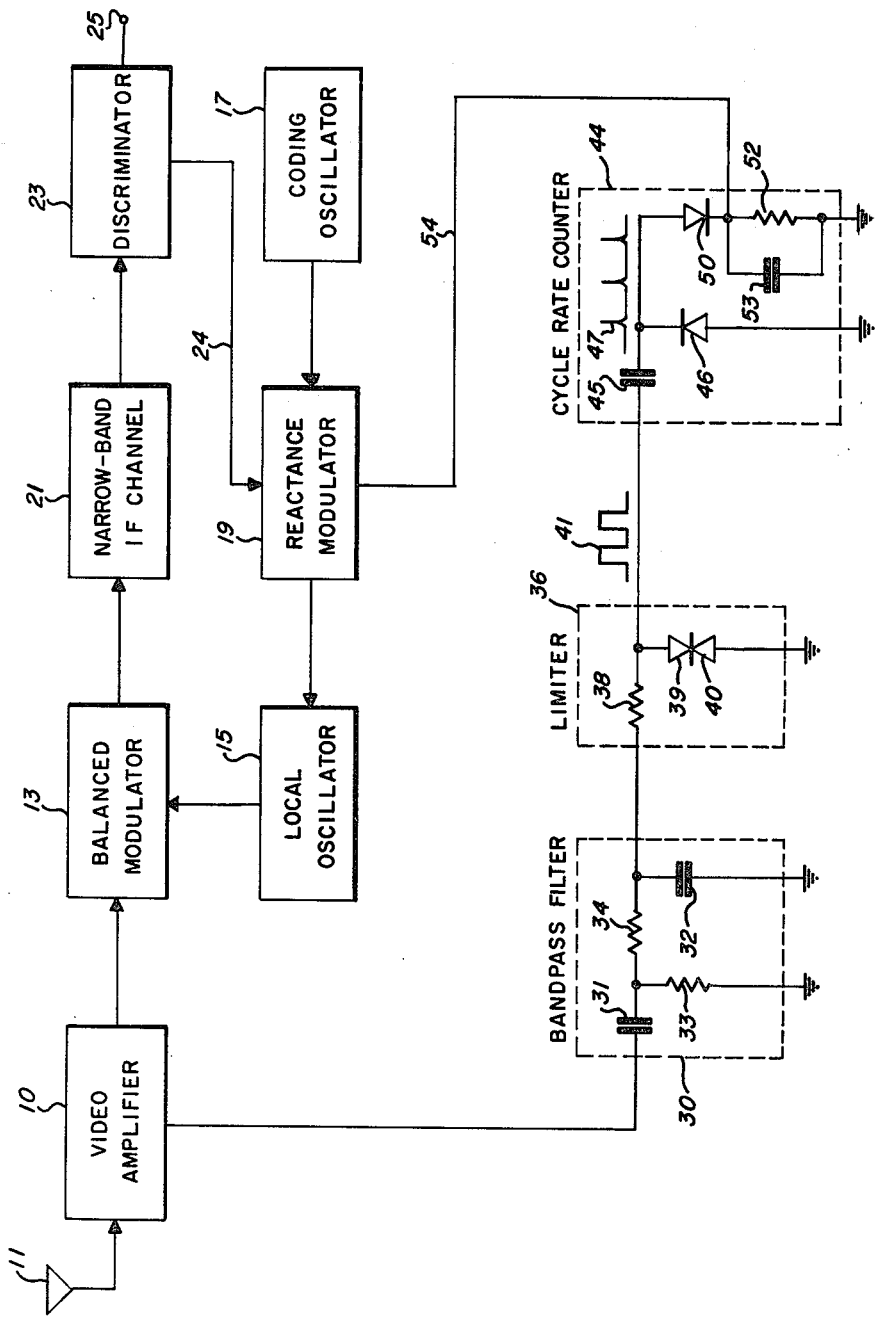

This invention relates to electronic signal acquisition apparatus and, more particularly, to a frequency scanning radio receiving system which searches a region in the spectrum of radio frequency electromagnetic wave energy to determine the presence therein of signal energy and controls the width of the band over which the search is made in response to the presence of signal energy therein.

In continuous wave radar systems in which a receiver scans a given band of frequencies, or spectral range, in order to lock on a particular signal, there are situations in which undesirable Doppler return signals from the ground prevent the signal-seeking device from locking upon the desired signal in the search band. These Doppler return signals from the ground, generally referred to as "clutter" or "clutter signals," are present when the search or frequency scanning acquisition radar is located in a moving vehicle which travels at a particular speed with respect to the ground. In these instances, the frequency scanning receiver frequently locks on the clutter signal prior to target signal acquisition or, when the receiver is located in a vehicle or missile, upon loss of the target signal due to prolonged fading during homing. The problem becomes most severe during the time the vehicle containing the acquisition apparatus is launched from the ground, or during a low altitude intercept of the vehicle and target. In such situations, the frequency at which the clutter signal occurs depends in part upon the speed of the vehicle over the ground, its altitude, and the frequency of the target signal. In general, the greater the velocity of the vehicle or missile, the greater becomes the minimum frequency at which clutter occurs.

To prevent the frequency scanning acquisition receiver from locking on clutter, present methods utilize signal filter apparatus which is adjusted to reject the lowest frequency expected to be encountered by the scanning receiver as a function of expected missile or vehicle velocity so that the clutter signal is prevented from entering the search band. However, signal rejection over a frequency guard band of considerable width becomes necessary to accommodate for variations in ground clutter frequency which occur due to vehicle or missile altitude, motor impulse variations of the vehicle carrying the scanning receiver, and other imposed conditions which affect the radial velocity component of the vehicle or missile with respect to ground. This guard band into which the receiver is prevented from scanning prevents, even in the absence of clutter, acquisition of low velocity targets, such as, for example, helicopters.

It is, therefore, an object of the invention to provide a relatively simple clutter rejection system which continuously measures clutter and automatically prevents scanning into clutter frequencies only during the actual presence of clutter, thus permitting Doppler frequency investigation to considerably lower velocities than now possible with present clutter rejection systems.

In accordance with the clutter rejection system of the invention, the presence of ground return clutter, which during low altitude vehicle travel is considerably greater than target signal amplitude, is detected and amplified to provide a video signal. The video signal is limited to provide a substantially square wave signal, and the number of crossings of the zero axis by the square wave signal is counted in a cycle rate counting circuit which provides a direct current output voltage proportional to the frequency of the clutter signals. This output voltage is then fed as a control signal to sweep control circuitry of a frequency scanning receiver to prevent the excursion of the sweep into the clutter frequency region only during the actual presence of a clutter signal. In effect then, the invention provides a dynamic sweep-limiting circuit which is operative only in the presence of clutter. In absence of clutter, the circuit permits sweeping into the clutter frequency region and the detection of signals from low velocity objects. To enhance the dynamic operation of the sweep control circuit, the output video is fed to a bandpass filter adapted to pass only the expected clutter frequencies. This filter attenuates noise and signal components outside the band of interest, improves the signal-to-noise ratio in the clutter measuring loop, and restricts the frequency band over which the counter is required to operate.

It should be understood that this clutter rejection circuit can be used with a signal-seeking tuner, such as, for example, the frequency scanning radio receiver disclosed in Patent No. 2,983,814, filed February 1, 1956, of William R. Mercer. The system disclosed therein includes a receiver which repetitiously scans a range of frequencies and presents narrow increments, or bands thereof continuously to a discriminator through a very narrow band filter, which can simultaneously be an amplifier. Thus, the signal receiver, which may be of any known form, is provided with a coding oscillator which, through proper control circuits including a reactance-modulated local oscillator, frequency- or phase-modulates the energy present in the receiver. Subsequently, the energy is demodulated by the discriminator to yield a signal at the modulation frequency. By these means, a true or coherent signal can be frequency-modulated or coded to provide a coded output signal as opposed to random noise which provides a substantially negligible output upon demodulation.

The present invention is, therefore, directed to apparatus which automatically restricts the band over which the signal receiver scans in the presence of undesirable clutter signals, and in the absence of clutter signals, permitting detection of signals from considerably lower velocity targets than possible with known rejection systems.

The foregoing and additional features of the invention will become apparent from a detailed description of an embodiment thereof which follows, wherein:

The drawing shows, partially in block diagram form and partly in schematic wiring diagram form, a preferred embodiment of the invention.

In the clutter rejection system illustrated in the drawing, the invention is shown applied to a receiver video amplifier 10, which may form a portion of a radar system of the C.W. type. As noted, this system is used to measure the relative speed of detected objects by the Doppler principle and when a transmitter, not shown, is suitably frequency-modulated, to measure their distance. A detailed description of a system of this type is included in the frequency-scanning radio receiver disclosed in U.S. Letters Patent No. 2,977,465 of R. C. Sanders et al., issued March 28, 1961. The video receiver 10 comprises a conventional antenna 11 and a broadband signal-amplifying channel which is tuned so that it will receive the band of energy which is to be examined. The broadband signal-amplifying channel is capable of passing any Doppler frequency from approximately one kilocycle to 100 kilocycles. A certain amount of frequency-modulated energy transmitted from a transmitter, not shown, continuously finds its way into the receiver antenna 11, so that, by the well-known phenomenon of beating instantaneously transmitted and received energy together, the receiver amplifier is able to furnish a difference signal representing speed. The output of the broadband video channel is mixed by a symmetrical modulator or mixer 13, with the signal of a reference or local oscillator 15, such as a Hartley-type oscillator, which is normally swept in frequency in a known manner by a coding oscillator 17 through the medium of a reactance modulator 19. Thus, coding oscillator 17 delivers its output to reactance modulator 19, and thereby causes frequency modulation of the signal output of the local or reference oscillator 15. The local oscillator voltage in the signal output is suppressed by the balanced modulator 13. As a result, the signal from the broadband video amplifier 10 which is presented to the balanced modulator 13 is frequency-modulated, and the IF signal which is fed to a narrow-band IF channel 21 carries the same frequency modulation. The output of the narrow-band IF channel is then fed to a discriminator 23 which may be the existing discriminator of a frequency-modulation receiver system. Of course, the discriminator may already exist in the receiver and may be employed for the present purpose. If the information present in the narrow-band IF channel 21 contains a coherent signal, this signal will be frequency-modulated in accordnace with the modulation of the reference oscillator 15, and the modulation will be recoverable in the discriminator. On the other hand, if merely random noise is present, it will not provide a modulation envelope which is recoverable in the discriminator 23. The recoverable output coded signal from discriminator 23 can be used as an AFC control voltage which is applied by way of lead 24 to control the reactance modulator to lock on a coherent signal. This coherent signal, however, may include an undesirable Doppler ground return signal, since such signals provide a coherency as opposed to incoherent noise signals. As the local oscillator is swept into the low frequency portion of the sweep, Doppler return signals from the ground, or clutter signals, enter the speed search band and prevent a lock being achieved on the proper target.

In accordance with the clutter signal rejection system of the invention, the scanning receiver sweep is controlled by clutter signals to prevent sweeping the lower frequency portion of the search band, referred to as the clutter band. This is achieved by measuring the clutter signals present and providing a D.-C. control voltage proportional to the frequency of the clutter signals. This control voltage is fed to the reactance modulator 19 to prevent sweeping the local oscillator beyond the high frequency side of the clutter band. To do this, clutter signals entering the video amplifier 10 are fed to a clutter bandpass filter comprising series RC circuits including capacitors 31 and 32 and resistors 33 and 34. This filter passes only expected frequencies in the clutter band over a band width, for example, of 1 kilocycle. This prevents noise and undesirable signals from entering the rejection circuit and permits essentially linear direct current output of the cycle rate counting circuit versus frequency, since only a small portion of the cycle rate counter charging characteristic is utilized.

The clutter signals passing clutter filter 30 are fed to a limiter 36 which, for simplicity, consists of a limiting resistor 38 in series with series-connected back-to-back Zener diodes 39 and 40 which provide a square wave output 41 in response to the alternating clutter signals. The square wave clutter signals are then fed to the cycle rate counting circuit 44, which generates a direct current voltage proportional to the frequency of the clutter signals. A conventional diode clamping circuit comprising capacitor 45 and a diode limiter 46 is connected in the input circuit of the cycle rate counter and removes the negative portion of the square wave clutter signals to provide positive-going pulses 47 suitable for counting. These positive clutter pulses are fed to a rectifier diode 50, which may be of the dry-disk or contact type. The rectifier diode produces a direct current across a load resistor 52 which is proportional to the number of pulses and charges integrating capacitor 53 to a direct current voltage level proportional to the clutter frequency. The output of the clutter rejection circuit is, therefore, a direct current control voltage which is fed by way of lead 54 and an isolating resistor, not shown, to the control circuit of a reactance tube, such as to the grid of the reactance tube shown in the aforementioned United States Letters Patent No. 2,983,814. The clamping voltage of the reactance tube shown therein is adjusted to prevent the local oscillator from sweeping into the clutter band during the presence therein of clutter signals. In this manner, a coherent output signal is available at the discriminator output terminal 25, rather than a clutter signal, since the local oscillator is prevented from being swept into the clutter band when a clutter return is present. This dynamic sweep-limiting system further permits adjustment of the control voltage to bias the sweep modulator tube at the point where the excursions of the sweep extend substantially adjacent to a given clutter signal, yet not far enough to lock on the clutter signal. This arrangement, therefore, provides a narrow dynamic guard band which varies with the frequency of the clutter signals. This automatic sweep-limiting operation permits investigation of low speed Doppler signals not heretofore possible in either simple or complex clutter or guard band rejection schemes. Thus, clutter due to vehicle motion is, in effect, a spectrum, due to the target signal or desired signal filling the side lobes or main lobe of the search antenna. In counting the cycles within this spectrum, the device counts to a frequency higher than the power center of gravity of the clutter spectrum which is the frequency corresponding to maximum clutter amplitude. This counting procedure, thus, always assures a narrow guard band on the high frequency side of the spectrum and enables extensive sweeping in the region of clutter signals without locking on the clutter signals.

As is well known, radar apparatus employs the foregoing components and further employs suitable means to display the relative speed indicated by a detected signal or code information in accordance with the condition of the sweep generator, or other means for scanning the local oscillator at a time when a signal is detected. The present invention is, however, directed to the problem of continuously measuring clutter signals and of automatically limiting the frequency swept by the scanning means. Other and further modifications within the spirit and scope of the invention will occur to those skilled in the art, and many embodiments thereof can be constructed without the exercise of further invention. Likewise, automatic frequency control and stabilization of the sweep generator may be afforded by means other than those which have been herein illustrated and described. No attempt is made herein to exhaust all possibilities. Accordingly, it is desired that this invention not be limited to the particular details of the embodiments disclosed except as defined by the appended claims.

What is claimed is:

1. In combination, means to scan a given frequency spectrum, means for measuring substantially noise-free signals of an undesired signal frequency band in a portion of said spectrum to provide a control signal proportional to the frequency of said undesired signals, and means responsive to said control signal to limit the sweep of said frequency scanning means.

2. In combination, means adapted to pass electrical signals of a predetermined frequency band, means for generating a control signal proportional to the frequency of substantially noise-free signals of an undesired lesser signal frequency band passed by said frequency band, and means responsive to said control signal to alter the width of said frequency band.

3. In combination, a signal detecting receiver for scanning a predetermined frequency spectrum having a swept oscillator adapted to sweep over a predetermined frequency range, means for counting substantially noise-free signals of an undesired signal frequency band in one portion of said frequency spectrum to provide a control signal, and means responsive to said control signal to alter the frequency range through which said oscillator is swept.

4. In combination, a receiver having a swept oscillator adapted to sweep over a predetermined frequency range, means for detecting substantially noise-free undesired clutter signals in the range swept by said oscillator, and means for limiting the frequency range swept by said oscillator in response to said clutter signals to eliminate said clutter signals from the receiver output.

5. In combination, a receiver comprising means to scan a given frequency spectrum, means for detecting substantially noise-free signals of an undesired signal frequency band in a portion of said spectrum, means for counting said detected undesired signals, means for providing a control signal proportional to the frequency of said counted signals, and means responsive to said control voltage to prevent the scanning means from sweeping into said portion of said spectrum.

6. In combination, a signal detecting system comprising a signal source, a tuned signal channel, frequency discriminating means capable of noise cancellation fed by said tuned channel, means for cyclically varying the effective resonant frequency response bandwidth of the tuned channel relative to the frequency of signals from said source, and means in response to signals in one portion of said channel to limit the extent of variation in said resonant frequency response bandwidth.

7. In combination, a receiver having a swept oscillator adapted to sweep over a predetermined frequency range, means for limiting the frequency range of the swept oscillator at one end of said frequency range including means adapted to measure the frequency of substantially noise-free undesired clutter signals to provide a control voltage output proportional to the frequency of said clutter signals, and means for controlling the frequency range of the swept oscillator in response to the presence of said clutter signals to eliminate said clutter signals from the receiver output.

8. In combination, a receiver having a swept oscillator adapted to sweep over a predetermined frequency range, means for limiting the frequency range of the swept oscillator at one end of said frequency range including means adapted to measure the frequency of substantially noise-free undesired clutter signals to provide a control voltage output proportional to the frequency of said clutter signals, said means including a bandpass filter in circuit with said receiver and adapted to pass clutter signals entering said filter from said receiver, and means for limiting the frequency range of the swept oscillator in response to said control voltage to eliminate said clutter signals from the receiver output.

9. A radio receiver comprising frequency-scanning means operative within a given spectrum, a demodulator means to produce a coherent output signal coupled to the output of said frequency-scanning means, said demodulator means including an input filter having a passband which is narrow compared with said spectrum, local oscillator means including said frequency scanning means to apply successive narrow increments of said spectrum to said filter, and means responsive to signals in one portion of said spectrum to limit the number of successive narrow increments of said spectrum applied to said filter.

10. A radio receiver comprising frequency-scanning means operative within a given spectrum, a demodulator means to produce a coherent output signal coupled to the output of said frequency-scanning means, said demodulator means including an input filter having a passband which is narrow compared with said spectrum, local oscillator means including said frequency scanning means to apply successive narrow increments of said spectrum to said filter, and means responsive to signals in one portion of said spectrum to limit the number of successive narrow increments of said spectrum applied to said filter, said latter means including means for generating a control voltage proportional to the frequency of signals in one portion of said spectrum.

11. A combination according to claim 1 wherein said means responsive to said control signal acts dynamically to provide a guard band which prevents sweeping within said undesired signal frequency band.

12. A combination according to claim 2 wherein said means responsive to said control signal acts dynamically to provide a guard band which prevents sweeping within said undesired signal frequency band.

13. A combination according to claim 3 wherein said means responsive to said control signal acts dynamically to provide a guard band which prevents sweeping within said undesired signal frequency band.

References Cited in the file of this patent
UNITED STATES PATENTS

| | | |
|---|---|---|
| 2,442,583 | Bliss | June 1, 1948 |
| 2,507,525 | Hurvitz | May 16, 1950 |
| 3,001,064 | Alexis et al. | Sept. 19, 1961 |